(12) United States Patent
Moore et al.

(10) Patent No.: US 9,740,237 B2
(45) Date of Patent: Aug. 22, 2017

(54) ASSEMBLY FOR REMOVABLE DISPLAY AND INPUT DEVICES

(75) Inventors: Earl W Moore, Cypress, TX (US); Paul N Walker, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1109 days.

(21) Appl. No.: 13/435,140

(22) Filed: Mar. 30, 2012

(65) Prior Publication Data

US 2013/0257733 A1    Oct. 3, 2013

(51) Int. Cl.
*G06F 1/16* (2006.01)
*G06F 3/02* (2006.01)

(52) U.S. Cl.
CPC .......... *G06F 1/1618* (2013.01); *G06F 1/1632* (2013.01); *G06F 1/1654* (2013.01); *G06F 1/1669* (2013.01); *G06F 3/0202* (2013.01)

(58) Field of Classification Search
USPC ................................................ 345/156–172
See application file for complete search history.

(56) References Cited

U.S. PATENT DOCUMENTS

| | | | |
|---|---|---|---|
| 6,922,333 B2 | 7/2005 | Weng et al. | |
| 7,633,745 B2 | 12/2009 | Sakakibara et al. | |
| 7,768,508 B2 * | 8/2010 | Okuley | 345/204 |
| 7,889,483 B2 | 2/2011 | Sip et al. | |
| 2006/0125796 A1 | 6/2006 | Utz et al. | |
| 2006/0203437 A1 * | 9/2006 | Lev et al. | 361/681 |
| 2007/0236464 A1 * | 10/2007 | Kojo | 345/172 |
| 2010/0309143 A1 * | 12/2010 | Zhang et al. | 345/173 |
| 2011/0037701 A1 * | 2/2011 | Wang | 345/169 |
| 2011/0053651 A1 | 3/2011 | Miyashita et al. | |
| 2011/0157804 A1 | 6/2011 | Chen et al. | |
| 2011/0222238 A1 * | 9/2011 | Staats et al. | 361/679.55 |

FOREIGN PATENT DOCUMENTS

TW            200923621 A    6/2009

* cited by examiner

*Primary Examiner* — Sanghyuk Park
(74) *Attorney, Agent, or Firm* — HP Inc. Patent Department

(57) ABSTRACT

Embodiments of the present invention disclose a removable input device and assembly thereof. According to one embodiment, the assembly includes a base frame having a cavity for receiving the input device. A movable attachment member is formed on the base frame for facilitating attachment of a display device with the assembly. Furthermore, the input device is configured to removably attach to and from the base frame.

20 Claims, 4 Drawing Sheets

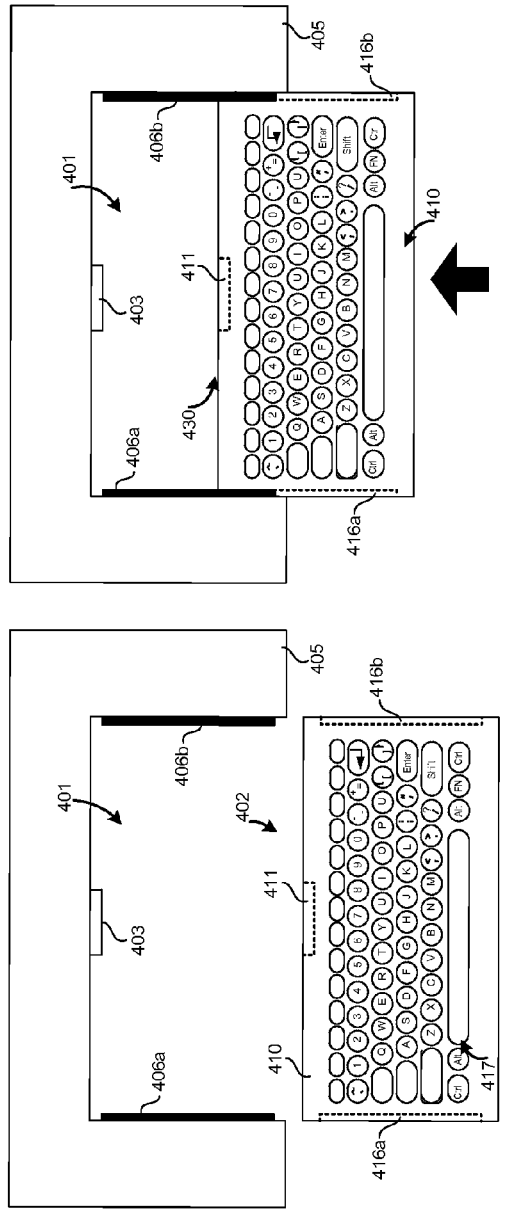
FIG. 4a
FIG. 4b
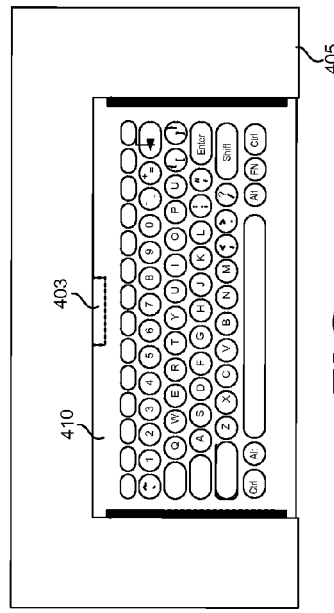
FIG. 4c

ASSEMBLY FOR REMOVABLE DISPLAY AND INPUT DEVICES

BACKGROUND

The emergence and popularity of mobile computing have made portable electronic devices, due to their compact design and light weight, a staple in today's marketplace. Many portable electronic devices employ a clam-shell type design such as notebook computers, netbooks, tablet personal computers, and certain handheld devices. Generally, a clam-shell design consists of two housings connected together at a common end. In most cases, one housing is utilized to provide a viewable display to a user while a second housing includes an area for user input. Tablet computers and other handheld devices generally feature a single touchscreen display for both displaying images and accepting user input via a virtual onscreen keyboard for example. As such portable devices become more widespread in use, however, additional functionality and input options are desired.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 4A-4C are top down views illustrating placement of the removable input device within the housing assembly according to an example of the present invention.

DETAILED DESCRIPTION OF THE INVENTION

Figure 1B:
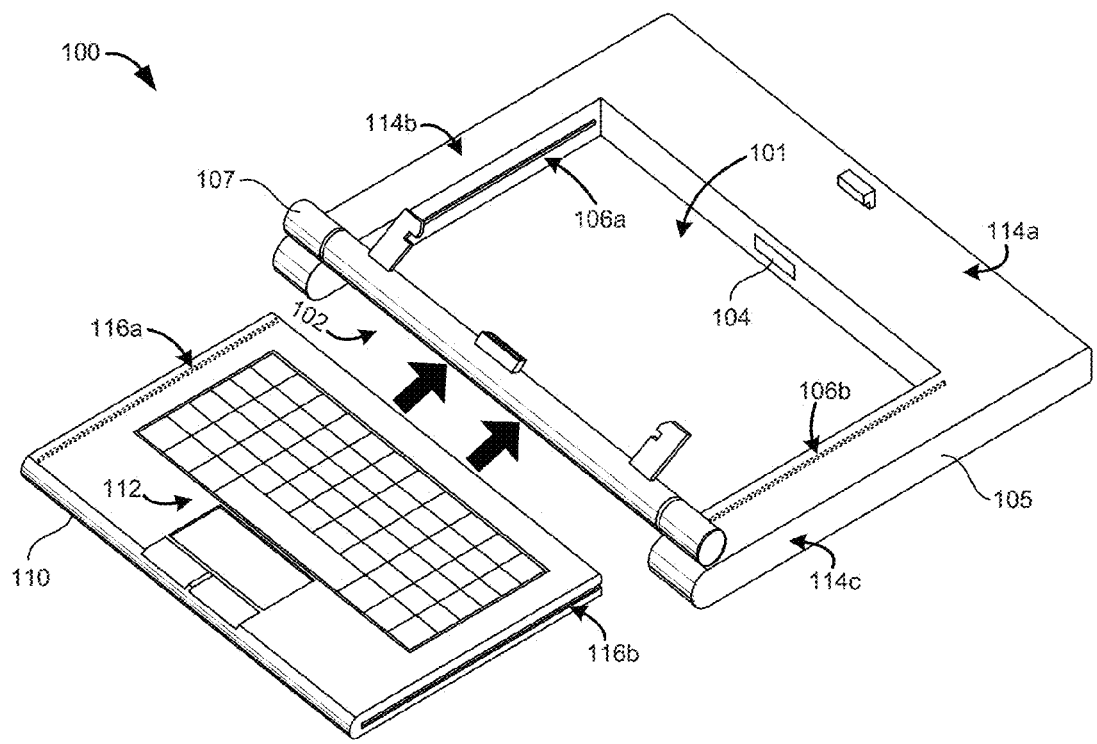
FIGS. 1A and 1B are three-dimensional perspective views of a removable input device and assembly thereof according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Convertible tablet personal computers feature a physical keyboard connected to a display housing. In such designs, the display housing may be rotated to either lie parallel to the keyboard housing for touchscreen use (i.e., tablet mode), or may also be rotated to lie perpendicular to the keyboard for traditional laptop use. However, this configuration does not permit the keyboard device to be removed from the housing so as to extend the work area, and the mechanical rotation involved in switching the display/input device between operating modes is often complex and unintuitive. Other solutions include display protection covers that also include integrated keyboards. However, these covers do not allow for an effective way of using the computing device in a tablet or slate operating mode and typically the keyboard is not removable from the device or assembly. As such, there is a need in the art for a portable housing assembly that allows for easy conversion of the device and assembly from tablet operating mode to a traditional laptop operating mode.

Examples of the present invention disclose a removable input device and assembly thereof. More particularly, examples disclosed herein provide a base frame for housing a removable keyboard and connecting with a display device. According to one example, the removable keyboard is configured to slide out horizontally from a cavity area of the base frame. In addition, the base frame provides multiple support features for enabling a docked display device to rotate along one edge of the assembly for traditional laptop viewing while also providing a means for the display device to lie parallel to the keyboard unit for mobile use and transport.

Figure 1A:
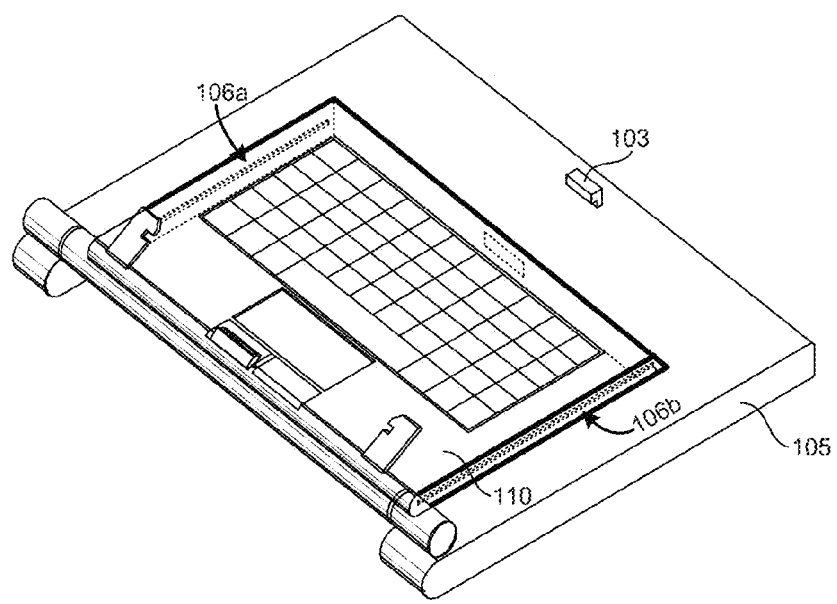

Referring now in more detail to the drawings in which like numerals identify corresponding parts throughout the views, FIGS. 1A and 1B are three-dimensional perspective views of a removable input device and assembly thereof according to an example of the present invention. As shown in FIG. 1A, the assembly 100 includes a base frame or housing 105 and a removable input device 110. In the present example, a wireless (e.g., Bluetooth) keyboard is presented as the removable input device. The base frame 105 includes a main contact portion 114a and two extended portions 114b and 114c that extends perpendicularly from opposite ends of the main contact portion 114a. Moreover, the base housing 105 includes a cavity area 101 for positioning and retaining the removable input device 110. In one instance, the inner cavity area 101 of the base frame only includes three side walls and an opening 102 for easy insertion and removal of the keyboard device 110. According to one example embodiment, the cavity area includes a pair of protruding side rails 106a and 106b formed along opposite sides within the cavity area. Moreover, the third side (non-rail side opposite cavity opening 102 and perpendicular to side rails 106a/106b) of the cavity area 101 includes an attachment feature 104 for further securely retaining the input device 110 within the cavity area 101. The keyboard device 110 includes a pair of inward side rails 116a and 116b configured to mate with the protruding side rails 106a and 106b of the base frame 105 so as to provide a secure attaching mechanism when the input device 110 is positioned within the cavity area 101 of the base frame 105 as shown in FIG. 1B. That is, the inward side rails 116a-116b and protruding side rails 106a-106b serve to allow the keyboard device 110 to be removably attached (i.e., capable of simple insertion and ejection) to and from the cavity area 101 of the base frame 105. Still further, the base frame 105 includes an axle support member 107 for facilitating attachment of a mobile computing device (e.g., tablet computer) with the base frame 105 as will be described in further detail with reference to FIGS. 2A and 2B. According to one example, the axle support member 107 is formed on a top surface of the extended portions 114b and 114c of the base frame 105. A retention element 103 is formed on a surface of the main contact portion 114a for facilitating securing attachment of a display device while in a mobile or transport mode as will be described in further detail with reference to FIGS. 3A and 3B. Still further, the base frame 105, input device 110, and/or axle support element 107 may be constructed using die cast, forged magnesium, plastic, aluminum, or similar rigid material.

Figure 2A:
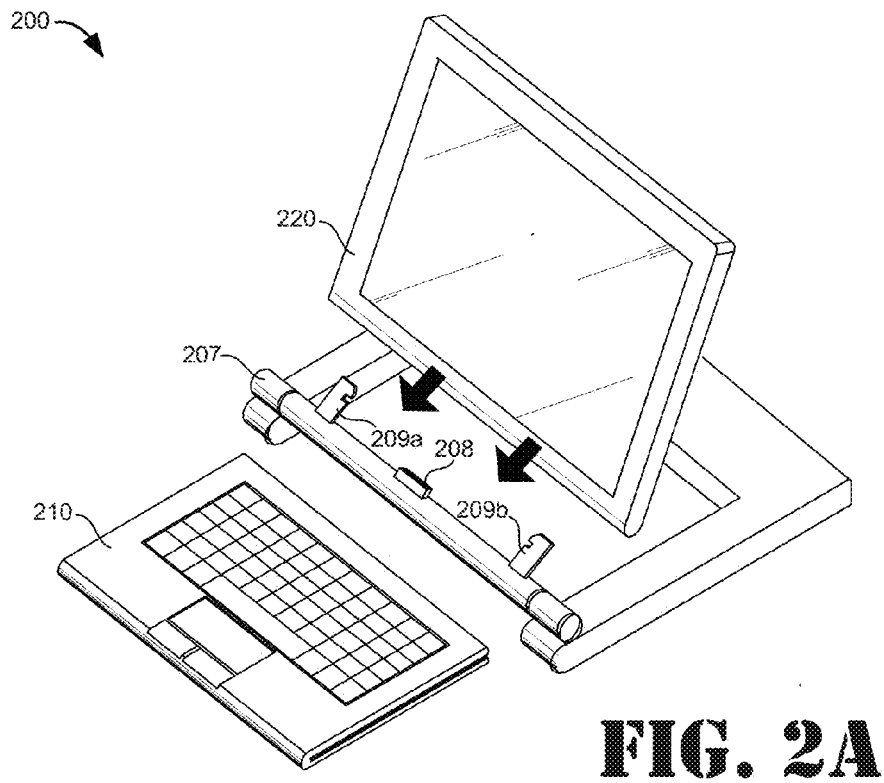
FIGS. 2A and 2B are three-dimensional perspective views of a mobile computing device being docked with the removable input device assembly according to an example of the present invention.
Figure 2B:
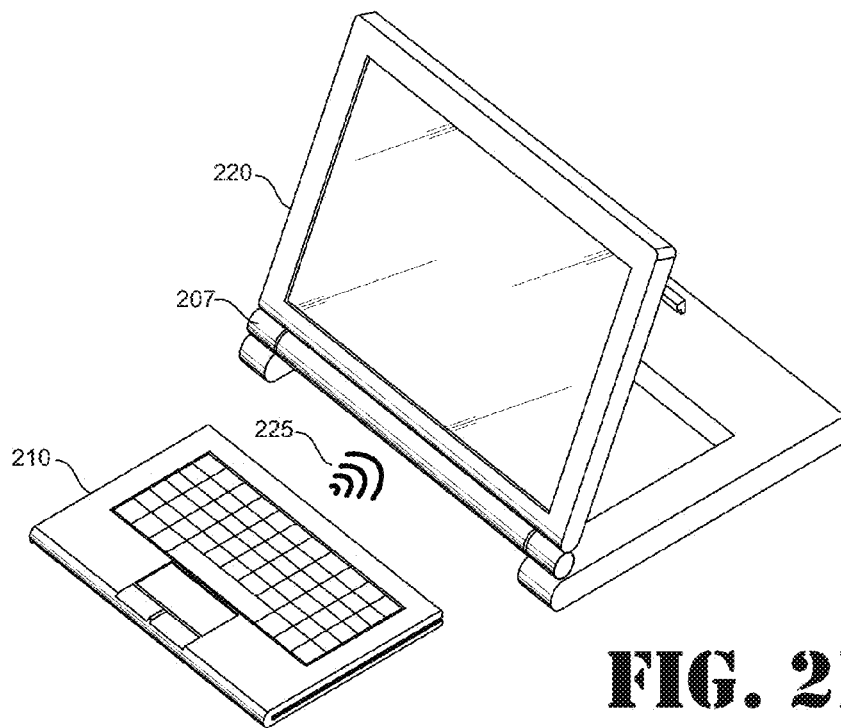

FIGS. 2A and 2B are three-dimensional perspective views of a computing device being docked with the removable input device assembly according to an example of the present invention. FIG. 2A depicts the mobile computing or display device 220 docking with the axle support member 207 of the base frame 205. More particularly, support member 207 includes a pair of hooks elements 209a and 209b and an electrical connector 208 for enabling electrical communication in addition to mechanical support for the mobile computing device. Additionally, support member 207 may serve as a means of charging the wireless keyboard 210 (via communication interface 225 shown in FIG. 2B). Axle member 207 further includes built-in torque elements for allowing an operating user to rotate and position the display device 205 to a desired viewing angle. Accordingly, and as depicted in the example of FIG. 2B, the present configuration allows the user to dock and tilt a tablet computing device 220 into a desired upright viewing angle with the base frame 205 serving as a support stand for the display device 220. The wireless keyboard 210 may then be utilized for providing input to the display device 220 (via wireless interface 225) so as to replicate working on a standard notebook personal computer.

Figure 3A:
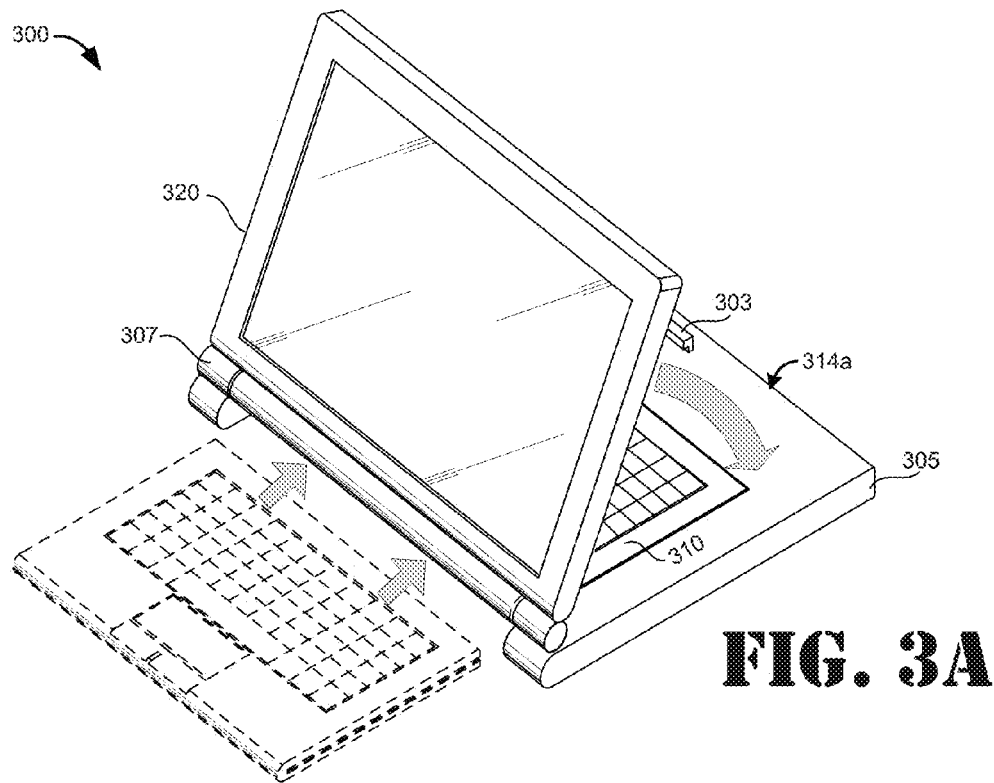
FIGS. 3A and 3B illustrate the display and removable input device assembly transitioning from a first operating mode to a second operating mode according to an example of the present invention.
Figure 3B:
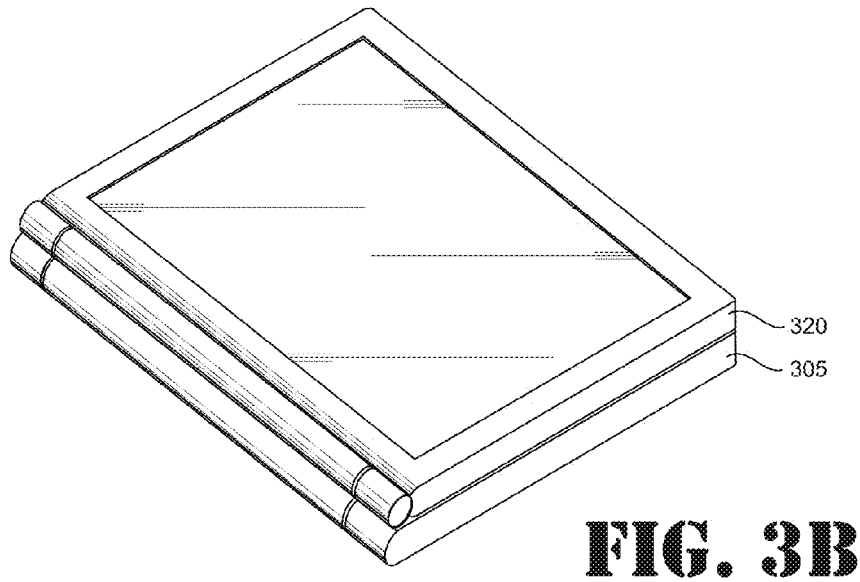

FIGS. 3A and 3B illustrate the display and removable input device assembly transitioning from a first operating mode to a second operating mode according to an example of the present invention. As shown in FIG. 3A, the first operating mode (i.e., standard notebook input) includes the display device 320 being attached to the base frame 305 via support member 307, while the wireless keyboard 310 rests outside the base frame and below the display device 320 for example. Transition from the first operating mode to the second operating mode (i.e., tablet or slate mode) begins with placement of the keyboard 310 within the cavity of the base housing 305 frame as shown in FIG. 3A. The display device 320 is then rotated downward and clockwise (as indicated by the directional arrow) so as to lie parallel and substantially aligned (vertically) with the keyboard 310. Moreover, the main contact portion 314a of the base frame 305 includes a device retention element 303 formed on a facing surface thereof. The retention element 303 may comprise of a magnet, latch, or similar tool for sufficiently joining the display device 320 with the base frame 305. More particularly, the retention element 303 is configured to engage with the rear surface (i.e., surface opposite display) of the display device 320 when the device 320 abuts the main contact portion 314a. As a result, a top surface of the keyboard 310 is protected by the bottom surface (i.e., surface opposite display) of the display device 320 while in the second operating mode.

FIGS. 4A-4C are top down views illustrating placement of the removable input device within the housing assembly according to an example of the present invention. As shown here, the keyboard device 410 includes a plurality of keys 417 formed on an upper input surface and a pair of inward side rails or grooves 416a and 416b formed along opposite sides. The housing frame 405 includes an cavity area 401 for receiving the input device 410 and a pair of protruding side portions 406a and 406b configured to mate (i.e., corresponding in size and shape) with the inner grooves 416a and 416b of the keyboard device 410. Still further, the cavity area 401 of the housing frame 405 includes a coupling element 403 for joining with a leading edge 411 of the input device 410. For example, the coupling element 403 may be a magnet, hook-and-loop fastener, adhesive or similar fastening element so as to provide additional coupling support for the input device 410 when placed entirely within the cavity area 401 of the housing frame 405. FIG. 4B depicts the keyboard device 410 partially-inserted into the cavity area 401 of the housing frame 405 through the opening 402 of the housing frame 405. As shown here, the protruding rails 406a and 406b of the housing frame 405 begin to engage with the inner grooves 416a and 416b of the input device 410. The keyboard device 410 is firmly joined with the housing frame 405 when the inner grooves 416a and 416b of the device are substantially engaged with the protruding rails 406a and 406b and the leading edge 430 of the input device 410 abuts the affixing element 403 of the housing frame 405.

Embodiments of the present invention provide a removable input device and assembly thereof. Many advantages are afforded by the configuration in accordance with embodiments of the present invention. For example, the disclosed assembly is very simple in its implementation and construction thus allowing for straightforward operation and rapid manufacture. Still further, the present configuration enables the keyboard device to be protected when stowed within the cavity while in the tablet operating mode, but also gives the user the flexibility to position and use the keyboard and display device as a traditional clam-shell notebook.

Furthermore, while the invention has been described with respect to exemplary embodiments, one skilled in the art will recognize that numerous modifications are possible. For example, although exemplary embodiments depict a non-convertible tablet personal computer as the mobile computing device, the invention is not limited thereto. For example, the mobile computing or display device may be a smartphone, a stand-alone display or any other electronic device configured with a touch-screen interface. Moreover, the housing frame could also incorporate additional battery power, and/or a touchpad could be included on the keyboard device. Thus, although the invention has been described with respect to exemplary embodiments, it will be appreciated that the invention is intended to cover all modifications and equivalents within the scope of the following claims.

What is claimed is:

1. An assembly comprising:
    a base frame having a cavity for receiving an input device, the cavity being defined, in part, by two extended portions extending from a main contact portion of the base frame;
    a movable attachment member, comprising an axle support member, formed on the base frame and configured to facilitate attachment with a display device, wherein the axle support member is positioned across an opening of said cavity between ends of the two extended portions that are opposite the main contact portion of the base frame; and wherein the input device is configured to removably attach to and from the base frame.

2. The assembly of claim 1, wherein the base frame is to allow the input device to slide out horizontally from the cavity.

3. The assembly of claim 1, wherein the movable attachment member includes at least one hook element for enabling docking of the display device.

4. The assembly of claim 1, wherein the display device is capable of rotation on the movable attachment member when the display device is docked such that a rear side of the display device, opposite a display surface, is facing keys of the input device so as to protectively cover the keys of the input device.

5. The assembly of claim 1, wherein the input device is a wireless keyboard comprising alphabetic and numeric keys and sized to receive user input by two-handed typing, said keyboard being configured to communicate wirelessly with the display device.

6. The assembly of claim 1, wherein the base frame includes a pair of protruding side rails formed along opposite sides within the cavity.

7. The assembly of claim 6, wherein the input device includes a pair of inward side rails configured to mate with the protruding side rails of the base frame when the input device is docked within the cavity of the base frame.

8. The assembly of claim 6, wherein the base frame includes an coupling element formed within the cavity along a side perpendicular to the sides having the protruding side rails for facilitating securing attachment with an edge of the input device.

9. The assembly of claim 1, further comprising a main contact portion of the base frame, the main contact portion having a retention element formed thereon configured to engage with a rear surface of the display device when in a second operating mode.

10. A computing device comprising:
    a mobile computing device comprising a display device;
    a housing having an inner cavity for receiving an input device, the inner cavity being defined, in part, by two extended portions extending from a main contact portion of the housing, wherein the housing includes a movable attachment member comprising an axle support member configured to facilitate docking of the mobile computing device and display device with the housing, wherein the axle support member is positioned across an opening of said inner cavity between ends of the two extended portions that are opposite the main contact portion of the housing;
    a keyboard device comprising alphabetic and numeric keys and sized to receive user input by two-handed typing, the keyboard device configured to removably attach to the housing and slide out horizontally from within housing, wherein the keyboard device comprises a wireless transceiver so as to communicate data wirelessly with the mobile computing device when fully detached from the housing.

11. The computing device of claim 10, wherein the movable attachment member includes at least one hook element for enabling docking of the display device.

12. The computing device of claim 11, wherein the display device is capable of rotation about the movable attachment member when the display device is docked with the at least one hook element in a first operating mode.

13. The computing device of claim 10, wherein the mobile computing device is rotatable on the moveable attachment member to rotate parallel to and covering a side of the inner cavity such that a rear side of the display device, opposite a display surface, is facing keys of the keyboard device so as to protectively cover the keys of the keyboard device.

14. The computing device of claim 10, wherein the housing includes a pair of protruding side rails formed along opposite sides of the two extended portions within the inner cavity.

15. The computing device of claim 14, wherein the keyboard device includes a pair of inner grooves configured to mate with the pair of protruding side rails of the housing when the input device is docked within the inner cavity of the housing.

16. The computing device of claim 14, wherein the housing includes a coupling feature formed within the inner cavity along a side perpendicular to sides having the pair of protruding side rails for facilitating coupling attachment with a leading edge of the keyboard device.

17. The computing device of claim 10, wherein the main contact portion includes a retention element formed thereon configured to engage with a rear surface of the display device when in a second operating mode.

18. An assembly for a keyboard device and display device, the assembly comprising:
    a housing frame having an inner cavity area for receiving the keyboard device, the inner cavity being defined, in part, by two extended portions extending from a main contact portion of the housing frame, wherein the housing frame includes a rotatable attachment member comprising an axle support member configured to facilitate docking of the display device with the housing frame, and further wherein the axle support member is positioned across an opening of said inner cavity between ends of the two extended portions that are opposite the main contact portion of the housing, and
    wherein the keyboard device is configured to communicate wirelessly with the display device;
    wherein the display device is capable of rotation, supported on the rotatable attachment member, when the display device is docked with the housing frame; and
    wherein the keyboard device is configured to removably attach to the housing frame and slide out horizontally from the inner cavity area of the housing frame so as to become detached from the housing frame; and
    wherein the rotatable attachment member allows the display device to rotate parallel to and covering a side of the inner cavity area such that a rear side of the display device, opposite a display surface, is facing keys of the keyboard device so as to protectively cover the keys of the keyboard device.

19. The assembly of claim 18, wherein the housing frame includes a pair of protruding side rails formed along opposite sides of the two extended portions within the inner cavity area; and
    wherein the keyboard device includes a pair of inner grooves configured to mate with the protruding side rails when the input device is docked within the inner cavity area of the housing frame.

20. The assembly of claim 19,
    wherein a retention element is formed on the main contact portion of the housing frame for engaging with a rear surface of the display device when the display device abuts the contact portion.

* * * * *